United States Patent
Leconte et al.

(10) Patent No.: US 11,059,357 B2
(45) Date of Patent: Jul. 13, 2021

(54) VEHICLE CAB

(71) Applicant: AGCO International GmbH, Neuhausen (CH)

(72) Inventors: Valentin Daniel Joel Leconte, Cempuis (FR); Koffi Djidjan, Beauvais (FR)

(73) Assignee: AGCO International GmbH, Neuhausen (CH)

( * ) Notice: Subject to any disclaimer, the term of this patent is extended or adjusted under 35 U.S.C. 154(b) by 195 days.

(21) Appl. No.: 16/332,537

(22) PCT Filed: Aug. 1, 2017

(86) PCT No.: PCT/EP2017/069415
§ 371 (c)(1),
(2) Date: Mar. 12, 2019

(87) PCT Pub. No.: WO2018/050348
PCT Pub. Date: Mar. 22, 2018

(65) Prior Publication Data
US 2019/0210435 A1    Jul. 11, 2019

(30) Foreign Application Priority Data
Sep. 14, 2016  (EP) .................................. 16290175

(51) Int. Cl.
*B60J 7/04* (2006.01)
*B60J 7/057* (2006.01)
(Continued)

(52) U.S. Cl.
CPC ............... *B60J 7/041* (2013.01); *B60J 3/002* (2013.01); *B60J 7/0573* (2013.01); *B60J 7/1635* (2013.01); *B60Y 2200/22* (2013.01)

(58) Field of Classification Search
CPC ... B60J 3/002; B60J 3/005; B60J 7/041; B60J 7/0573; B60Y 2200/22
(Continued)

(56) References Cited

U.S. PATENT DOCUMENTS 4,848,827 A * 7/1989 Ou ........................... B60J 11/00
                                                        296/99.1
4,950,020 A * 8/1990 Chen ....................... B60J 11/00
                                                        296/136.02
(Continued)

FOREIGN PATENT DOCUMENTS

DE      3241841 A1    5/1984
DE   10 301796 A1    2/2004
(Continued)

OTHER PUBLICATIONS

UK Intellectual Property Office, Search Report for related UK parent Application No. GB I 6 I 6288.5, dated Dec. 14, 2016.
(Continued)

*Primary Examiner* — Joseph D. Pape

(57) ABSTRACT

A vehicle cab having a moveable roof section. The movement of the roof section is based on the location of the sun relative to the vehicle cab, such that the roof section moves to act as a sun shade for the cab. The roof section is provided with a sun sensor to determine the sun location, so that the roof section can automatically move to provide an adaptive sun shade.

13 Claims, 6 Drawing Sheets

(51) Int. Cl.
*B60J 3/00* (2006.01)
*B60J 7/16* (2006.01)

(58) Field of Classification Search
USPC .................................. 296/210, 97.1, 190.08
See application file for complete search history.

(56) References Cited

U.S. PATENT DOCUMENTS

| | | | | |
|---|---|---|---|---|
| 5,913,566 | A * | 6/1999 | Stauffer | B60N 2/753 296/190.1 |
| 6,206,451 | B1 * | 3/2001 | Maano | B60J 11/00 296/136.04 |
| 2007/0210604 | A1 * | 9/2007 | Lin | B60J 3/0204 296/97.2 |
| 2016/0052374 | A1 | 2/2016 | Volbracht | |
| 2016/0288635 | A1 * | 10/2016 | Morazan | E04H 15/322 |
| 2017/0063290 | A1 * | 3/2017 | Kurlagunda | H02S 40/36 |

FOREIGN PATENT DOCUMENTS

| | | |
|---|---|---|
| DE | 10 2006 023910 A1 | 11/2007 |
| DE | 20 2014 104190 U1 | 9/2014 |
| JP | S56171388 U | 12/1981 |
| JP | 2011 088464 A | 5/2011 |
| KR | 100259954 B1 | 8/2000 |
| KR | 20090026548 A | 3/2009 |

OTHER PUBLICATIONS

European Patent Office, International Search Report for parent Application No. PCT/EP2017/069415, dated Oct. 10, 2017.

\* cited by examiner

VEHICLE CAB

BACKGROUND OF THE INVENTION

Field of the Invention

The present invention relates to a vehicle cab, in particular a vehicle cab for an agricultural or constructional vehicle.

Description of Related Art

Vehicles having high visibility requirements, e.g. agricultural or constructional vehicles, are generally provided with a panoramic vehicle cab, having relatively large window sections to facilitate operator visibility. However, one drawback of such large window sections is that the interior of the vehicle cab is exposed to a relatively large level of sunlight. Consequently, the interior of the vehicle cab is heated up by the direct sunlight through the window sections. Accordingly, when the vehicle is operating in relatively sunny conditions, the interior temperature of the cab may reach uncomfortable levels for a vehicle operator. Such a situation can require increased usage of vehicle air conditioning systems to cool down the operator and the cab interior, presenting increased load on the vehicle. In addition, the vehicle operator may be dazzled or blinded by direct sunlight when operating the vehicle.

It is known to provide sun shades within the vehicle cab, to shield the operator from direct sunlight. However, such sun shades are generally static, and require manual deployment by the vehicle operator. In addition, such static sun shades do not compensate for the movement of the vehicle in a work area, wherein the position of the sun relative to the vehicle cab changes as the vehicle moves. Such relative movement requires the vehicle operator to continually re-deploy the static sun shades to provide adequate shielding.

As a result, it is an object of the invention to provide a vehicle cab having an improved sun shield system.

SUMMARY OF THE INVENTION

Accordingly, there is provided an agricultural vehicle cab having:
  a cab window section;
  a roof section provided on top of the cab; and
  a sun sensor provided on the roof section,
  wherein at least a portion of the roof section is moveable relative to the cab window section to shade the interior of the cab, and wherein the movement of the said at least a portion of the roof section is controlled based on the position of the sun determined by the sun sensor.

A moveable roof section or portion thereof, controlled by the measured sun position, provides an effective and adaptive sun shade device. As the roof section position is controlled based on the sun position, accordingly the shading effect of the roof section automatically adjusts based on the relative movement of the sun and the vehicle cab, without requiring operator control. The roof section may comprise the entire roof portion of the cab, or may comprise a moveable section of the roof portion of the cab. The cab is intended for use on an agricultural vehicle, such as an agricultural tractor, an agricultural harvester, or an agricultural applicator vehicle.

The sun sensor will be understood as a device arranged to output a measure of the sun location relative to the vehicle cab. The sun sensor may comprise an analogue sensor whose output signal is a continuous function of sun angle, or a digital sensor that produces an encoded discrete output that is measured by the sun angle function. In an additional or alternative aspect, the vehicle cab may comprise a position sensor, e.g. a GNSS sensor such as a GPS sensor. In such a system, the position sensor is operable to determine the current location of the vehicle cab, and subsequently determine the location of the sun relative to the vehicle cab, e.g. based on an almanac listing the sun positions for different locations at different times.

Preferably, the cab comprises a panoramic cab, having a substantially unobstructed cab window section. Preferably, the cab is intended for use on an agricultural or constructional vehicle, preferably an agricultural tractor.

In one aspect, the roof section comprises at least one telescopic element arranged to extend and retract based on the position of the sun measured by the sun sensor.

The use of a telescopic element of the roof section allows for more flexible positioning of the roof section, and can provide for more extensive sun shade coverage by the roof section.

In a further aspect, the vehicle cab further comprises a user interface to provide user control of the roof section position.

While the roof section preferably automatically moves based on the relative position of the sun, an additional user control interface may be provided to allow for user adjustment of the roof section position, e.g. if a user requires re-positioning of the roof section to increase the viewable area in a particular direction.

Preferably, a reflective material is provided on at least a portion of the roof section, such that the reflective material acts to reflect solar radiation away from the vehicle cab.

Through use of sun reflective material on the roof section, accordingly the interior of the cab is further prevented from excessive solar heating.

Preferably, the vehicle cab comprises a first actuator to effect longitudinal movement of the roof section relative to cab window section. Preferably, the vehicle cab comprises a second actuator to effect lateral or transverse movement of roof section relative to cab window section.

The first and second actuators comprise any suitable actuatable element, for example a rack-and-pinion element, a hydraulic actuator, an electric motor, an eccentric rotating actuator, etc.

In a further aspect, the vehicle cab further comprises a rain sensor, wherein movement of the roof section is controlled at least in part based on the detection of rain by the rain sensor. The rain sensor can be combined with a wind direction sensor, such that the roof section is moved to act as a rain shield for the cab window section.

In a further aspect, the vehicle cab further comprises an accelerometer or directional sensor, wherein the movement of the roof section is based at least in part on the direction of movement of the vehicle cab detected by the directional sensor.

In a further aspect, the vehicle cab further comprises an inclinometer, wherein the movement of the roof section is based at least in part on the incline or orientation of the vehicle cab.

Preferably, the roof section comprises at least one photovoltaic element, preferably a solar panel, to generate power for supply to a power consumer.

The use of a photovoltaic element on the roof section provides a source of renewable energy for the vehicle, which may be used to at least partially power vehicle components such as a vehicle HVAC system. Such use of renewable power can result in more efficient operation of the vehicle.

It will be understood that the at least one photovoltaic element may be provided as a moveable portion of the roof section, or the element may be arranged to substantially cover an entire surface of the roof section.

In a further aspect of the invention, the movement of the roof section is at least partially controlled based on the light levels received at the photovoltaic element. Preferably, the movement of the roof section is partly controlled to maximise the light levels received at the photovoltaic element.

By controlling the movement of the roof section based on the received light levels of the photovoltaic element, accordingly the power generation levels of the photovoltaic element can be maximised for the light levels available.

In a preferred aspect, the at least one photovoltaic element is coupled with a linkage to allow for the movement of the at least one photovoltaic element relative to the vehicle cab. Preferably, the linkage allows for the at least one photovoltaic element to be positioned such that the available light levels received at the element are at a maximum, to ensure the maximum power generation output is provided.

Preferably, the linkage allows for multiple degrees of freedom of the element. Preferably, the linkage allows for rotation about at least one, preferably two, further preferably three axes of rotation.

It will be understood that the roof section may be provided with a plurality of photovoltaic elements which are individually moveably, and which can be controlled to maximise the light levels received on each element of the plurality.

There is further provided a vehicle, preferably an agricultural tractor, having an agricultural vehicle cab as described above.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
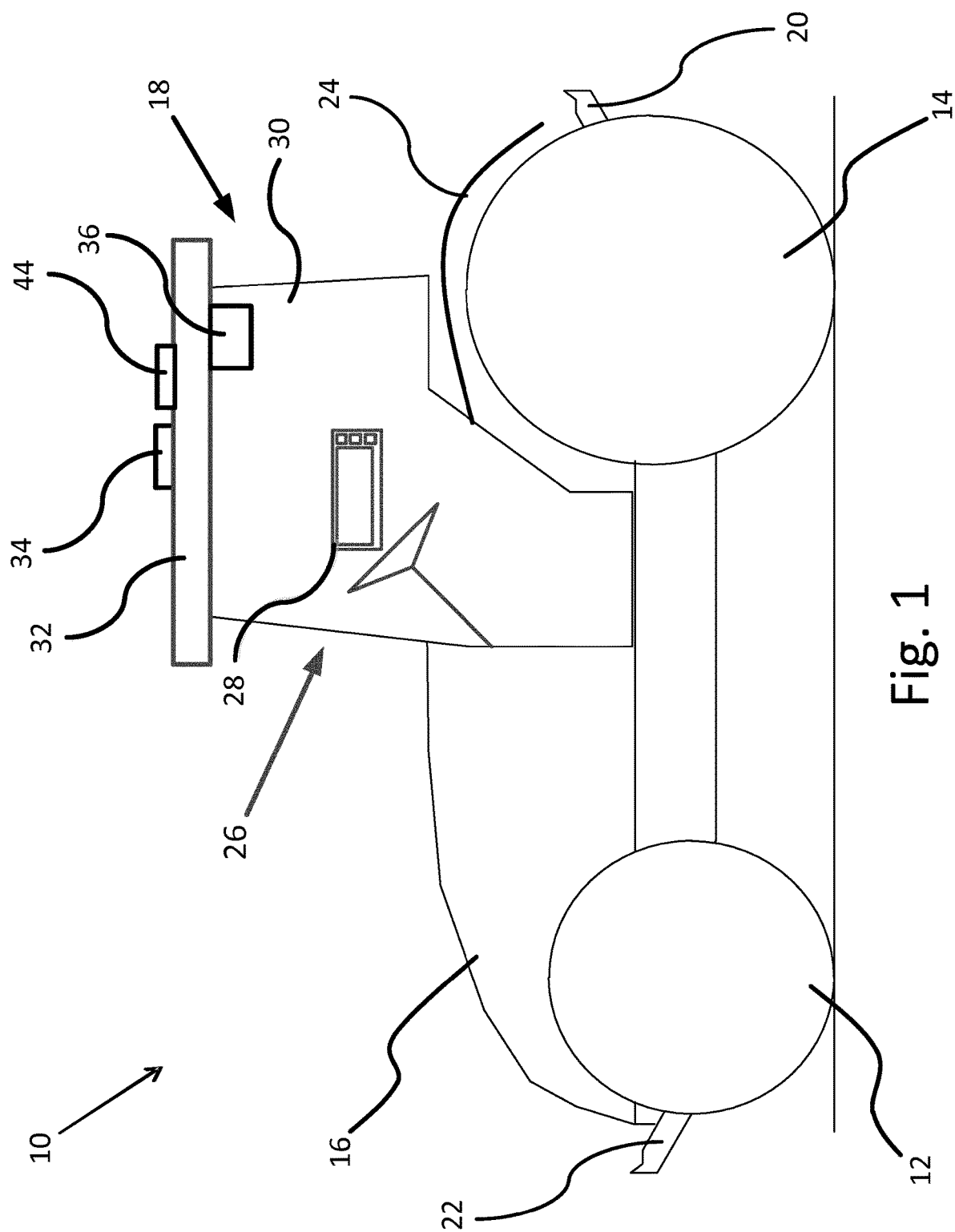
FIG. 1 is a side view of an agricultural tractor according to the invention.

With reference to FIG. 1, an agricultural vehicle according to the invention in the form of an agricultural tractor is indicated at 10. The tractor 10 comprises front wheels 12 and rear wheels 14, a forward engine section 16 and a vehicle cab section 18. A rear linkage 20 is provided at the rear of the tractor 10, and a front linkage 22 is provided at the front of the tractor 10. The front and rear linkages 20,22 can be actuated or moved using associated hydraulic cylinders. Rear fenders 24 are provided to cover a portion of the rear wheels 14.

Within the cab 18, an operator station 26 is provided. The operator station 26 comprises a user interface device 28 which is used to display information relating to tractor operation, and to control different elements of the tractor 10.

The vehicle cab section 18 comprises a cab window section 30 and a roof section 32 provided at the top of the cab window section 30. The cab window section 30 comprises a substantially panoramic cab, having a substantially unobscured view of the surroundings of the tractor 10.

The roof section 32 covers the upper surface of the cab window section 30. The roof section 32 is moveable in the longitudinal and the lateral directions, relative to the cab window section 30. Accordingly, the roof section 32 can move to act as a sun shade for the below cab window section 30. The roof section 32 comprises a sun sensor 34 which is arranged to determine the location of the sun relative to the roof section 32 and the cab window section 30. The sun sensor 34 is coupled with a controller 36 which is operable to control the movement of the roof section 32 relative to the cab window section 30, based on the output of the sun sensor 34. In particular, the movement of the roof section 32 is controlled such that the roof section 32 acts as a sun shade to shield the cab window section 30 from direct sunlight.

It will be understood that at least a portion of the roof section 32 may be moveable. While the described embodiment shows the entire roof section 32 as moveable, it will be understood that further embodiments may also be provided, for example where the roof section 32 is made up of individually moveable sections or portions, where the movement of the individual portions can be controlled separately.

The controller 36 may be provided as a stand-alone control device for moveable roof section 32 of the vehicle cab 18, or may be implemented as part of a centralised controller or electronic control unit (ECU) of the tractor 10, which is operable to control any of the tractor components. The controller 36 can be coupled with the in-cab user interface 28 to provide information relating to the operation of the moveable roof section 32. In a further aspect of the invention, an operator may be able to control operation of the moveable roof section 32 using the user interface 28, for example if an operator requires re-positioning of the roof section 32 to increase the viewable area in a particular direction.

Figure 2A:
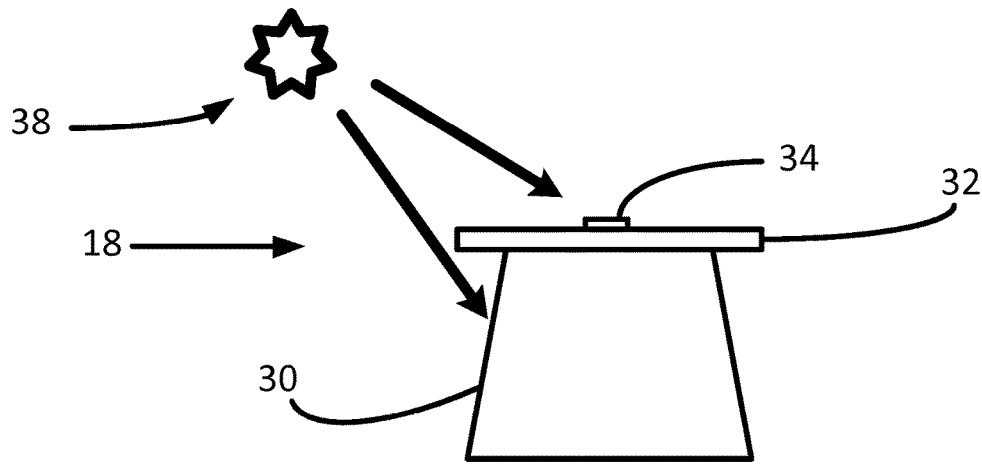
FIGS. 2A, 2B and 2C illustrate sample operation of an agricultural vehicle cab according to the invention.
Figure 2B:
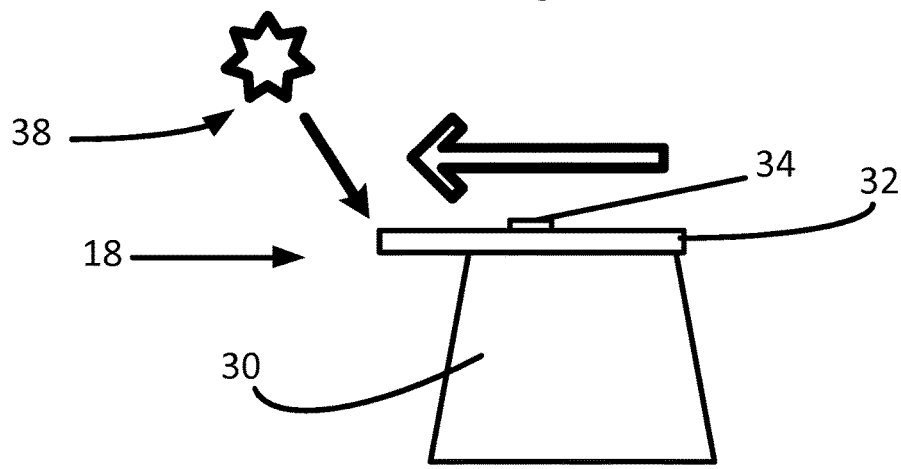
Figure 2C:
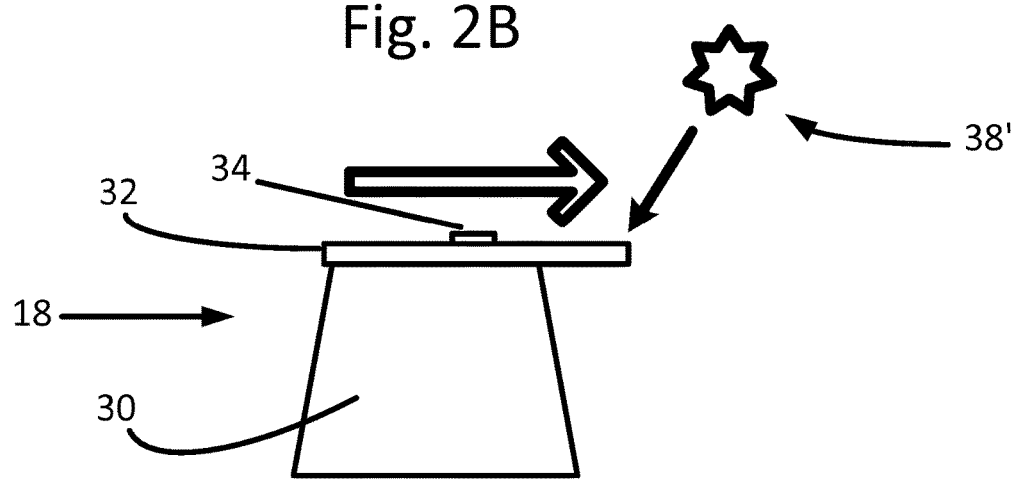

With reference to FIGS. 2A, 2B, and 2C, an example of operation of the vehicle cab section 18 is now illustrated. In FIG. 2A, the position of the sun 38 is such that direct sunlight shines directly into the interior of the cab window section 30. In this instance, the interior of the vehicle cab 18 will start to increase in temperature, due to the radiation effect of direct sunlight. In addition, the vehicle operator may be dazzled by the effect of the direct sunlight.

Sunlight also shines onto the sun sensor 34, provided on top of the roof section 32. In this case, the sun sensor 34 is operable to determine the location of the sun 38 relative to the cab section 18. The controller 36 (FIG. 1), receiving data indicative of the location of the sun 38, acts to move the roof section 32 relative to the cab window section 30. With reference to FIG. 2B, the controller 36 moves the roof section 32 in a forward longitudinal direction until the edge of the roof section 32 acts as a sun shade, preventing direct sunlight from shining onto the cab window section 30.

In FIG. 2C, the position of the sun 38 relative to the vehicle cab 18 has moved to a new position 38'. This may be due to the natural passage of the sun over time, and/or the movement of the vehicle cab 18 as the tractor 10 is operating. In this case, the sun sensor 34 acts to determine the new position of the sun 38' and provides this information to the controller 36. Accordingly, the controller 36 controls the roof section 32 to move in a reverse longitudinal direction, such that the roof section 32 acts to shade the cab window section 30 from direct sunlight as a result of the new sun position 38'. While the illustrated embodiment shows the movement of the roof section 32 along the longitudinal or forward-reverse direction of the tractor 10, it will be understood that the roof section 32 is also moveable in a lateral transverse or side-to-side direction, relative to the tractor 10.

The use of the sun sensor 34 to control the movement of the roof section 34 to act as an adaptive sun shade provides an automatic and reactive system for the prevention of cab overheating and operator sun blindness.

Figure 3:
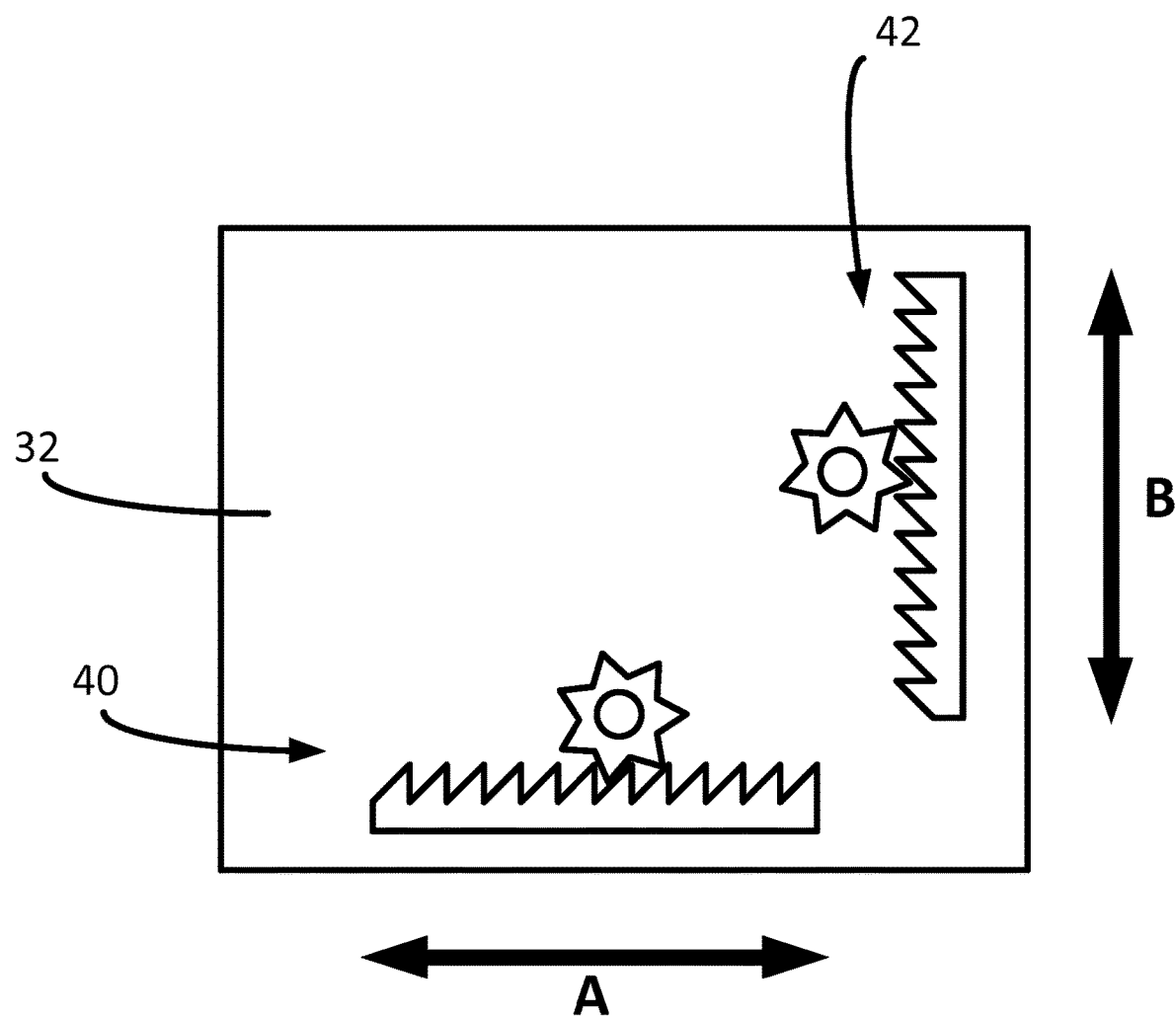
FIG. 3 is an example construction of a section of an embodiment of the vehicle cab of FIGS. 2A, 2B and 2C.

With reference to FIG. 3, a cross-sectional plan view of an embodiment of the roof section 32 is illustrated. In FIG. 3, the roof section 32 is provided with a first actuator device 40 and a second actuator device 42. The first actuator device 40 is configured to allow for forward and reverse longitudinal movement of the roof section 32, as indicated by arrow A, while the second actuator device 43 is configured to allow for side-to-side lateral or transvers movement of the roof section 32, as indicated by arrow B. Accordingly, through appropriate control of the actuator devices 40,42 by the controller 36, the roof section 32 can be positioned at any location above the cab window section 30, to shield the interior of the cab window section 30 from direct sunlight.

In the embodiment of FIG. 3, the actuator devices 40,42 are provided as rack-and-pinion devices, which may be actuated using suitable motors, e.g. electric motors. It will be understood that other suitable actuators may be used, which can be controlled by the controller 36, e.g. hydraulic cylinders or other linear actuator devices. It will be further understood that the roof section 32 may constructed as a suitable frame element allowing for movement of the actuator devices 40,42 relative to one another to provide for positioning of the roof section 32 at any possible location above the cab window section 30.

Figure 4:
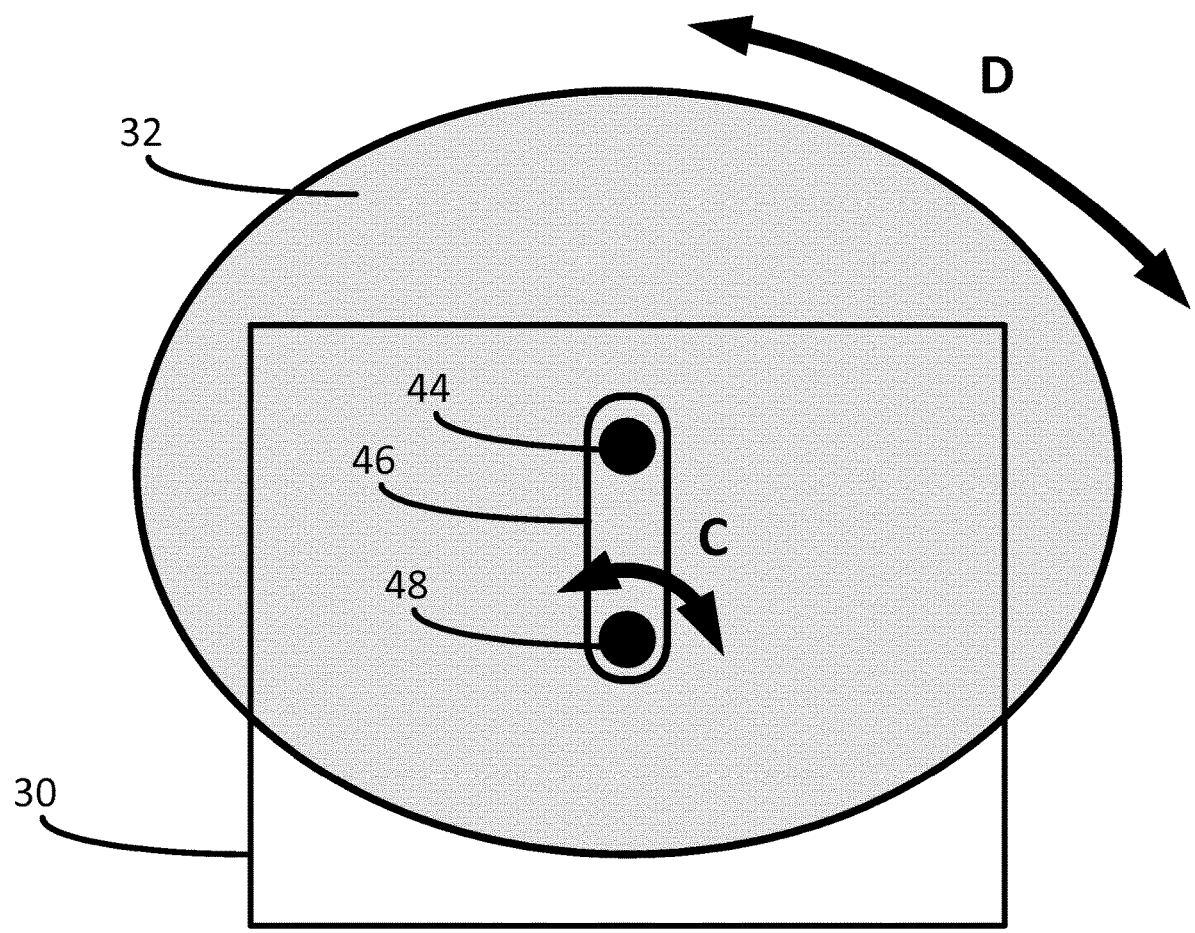
FIG. 4 is a further example construction of a section of an embodiment of the vehicle cab of FIGS. 2A, 2B and 2C.

A further alternative embodiment of the roof section 32 is illustrated in the plan view of FIG. 4. In FIG. 4, the roof section 32 is provided as an enlarged covering element pivotally mounted at central point 44 to an arm 46 which is rotatably mounted on top of the vehicle cab window section 30 at point 48. The arm 46 is rotatable about point 48 along the direction of arrow C, with the result that the position of the roof section 32 above the cab window section 30 is moveable about arrow D. Accordingly, the movement of the arm 46 is controllable by way of an electric motor or other similar rotary actuator.

Returning to FIG. 1, in a further embodiment the vehicle cab 18 may be provided with an additional sensor 44 coupled with the controller 36, wherein the additional sensor 44 provides additional date for the control of movement of the roof section 32. While the embodiment shows the additional sensor 44 located at the top of the roof section 32, it will be understood that the additional sensor may be located elsewhere on the vehicle cab 18 or on the other areas of the tractor 10 itself, dependent on the type of sensor used.

In one aspect, the additional sensor 44 may comprise a position sensor, e.g. a GNSS sensor such as a GPS receiver, which is arranged to determine the geographical location of the vehicle cab 18. Such information may be used in combination with a stored record or almanac detailing the time-varying position of the sun for that particular geographical location, such that the position of the sun relative to the tractor can be determined by the controller 36. Such a determination may be performed as an alternative to, or in combination with, the sun sensor 34.

Additionally or alternatively, the additional sensor 44 comprises at least one environmental sensor, e.g. a rain sensor, a wind sensor. In this case, the movement of the roof section 32 may be controlled such that the roof section 32 can provide a rain shield for the cab window section.

In an additional or alternative embodiment, the additional sensor 44 comprises an accelerometer or directional sensor, wherein the movement of the roof section is based at least in part on the direction of movement of the vehicle cab 18 detected by the directional sensor. The additional sensor 44 may further comprise an inclinometer, wherein the movement of the roof section 32 is based at least in part on the incline or orientation of the vehicle cab 18.

As a further possible enhancement of the system of the invention, it will be understood that the roof section 32 may comprise an extendible section, e.g. a telescopic element, which can be deployed to provide extended sun shade coverage for the cab window section 30. In a further aspect, the roof section 32 may be provided with a solar reflective material, such solar radiation is reflected away from the vehicle cab 18. The use of such reflective material on the roof section 32 can act to further prevent the interior of the cab 18 from excessive solar heating. Additionally or alternatively, the roof section 32 may be provided with at least one photovoltaic element, such as a solar panel, which can be used to generate power from sunlight received at the roof section 32. The power generated by the photovoltaic element can be supplied to power consumers of the vehicle, e.g. a vehicle HVAC system. The use of such a photovoltaic element on the roof section 32 of the cab 18 can provide for improved efficiency of operation of the cab 18 and associated vehicle, due to the use of renewable energy.

Figure 5:
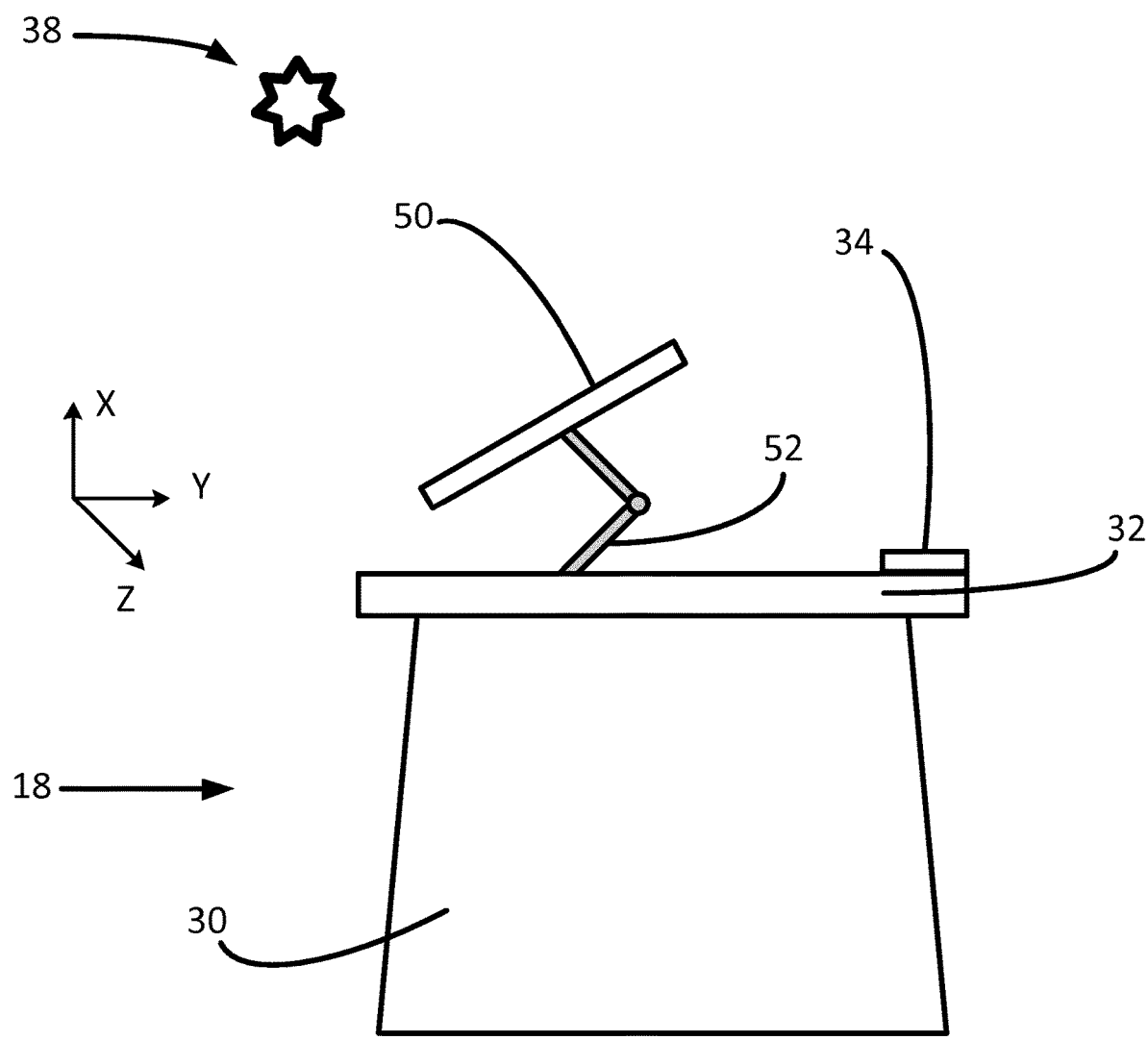
FIG. 5 is an illustration of a further embodiment of an agricultural vehicle cab according to the invention.

With reference to FIG. 5, a further embodiment of the invention is illustrated, wherein components common to other embodiments are provided with the same reference numerals. In the embodiment of FIG. 5, the roof section 32 is provided with a photovoltaic element in the form of solar panel 50. The solar panel 50 is mounted on the roof section 32 using adjustable linkage 52.

The linkage 52 is provided with controllable actuators (not shown) which allow for the position of the solar panel 50 to be controllable adjusted dependent on the relative position of the sun 38, as determined by the sun sensor 34. In this embodiment, the position of the solar panel 50 can be controlled to both reduce the solar load on the cab 18 by acting as a moveable sun shade for the cab window section 30, as well as to reposition the solar panel 50 to maximise the incident sunlight on the panel 50, thereby maximising the power generated by the solar panel 50.

Figure 6:
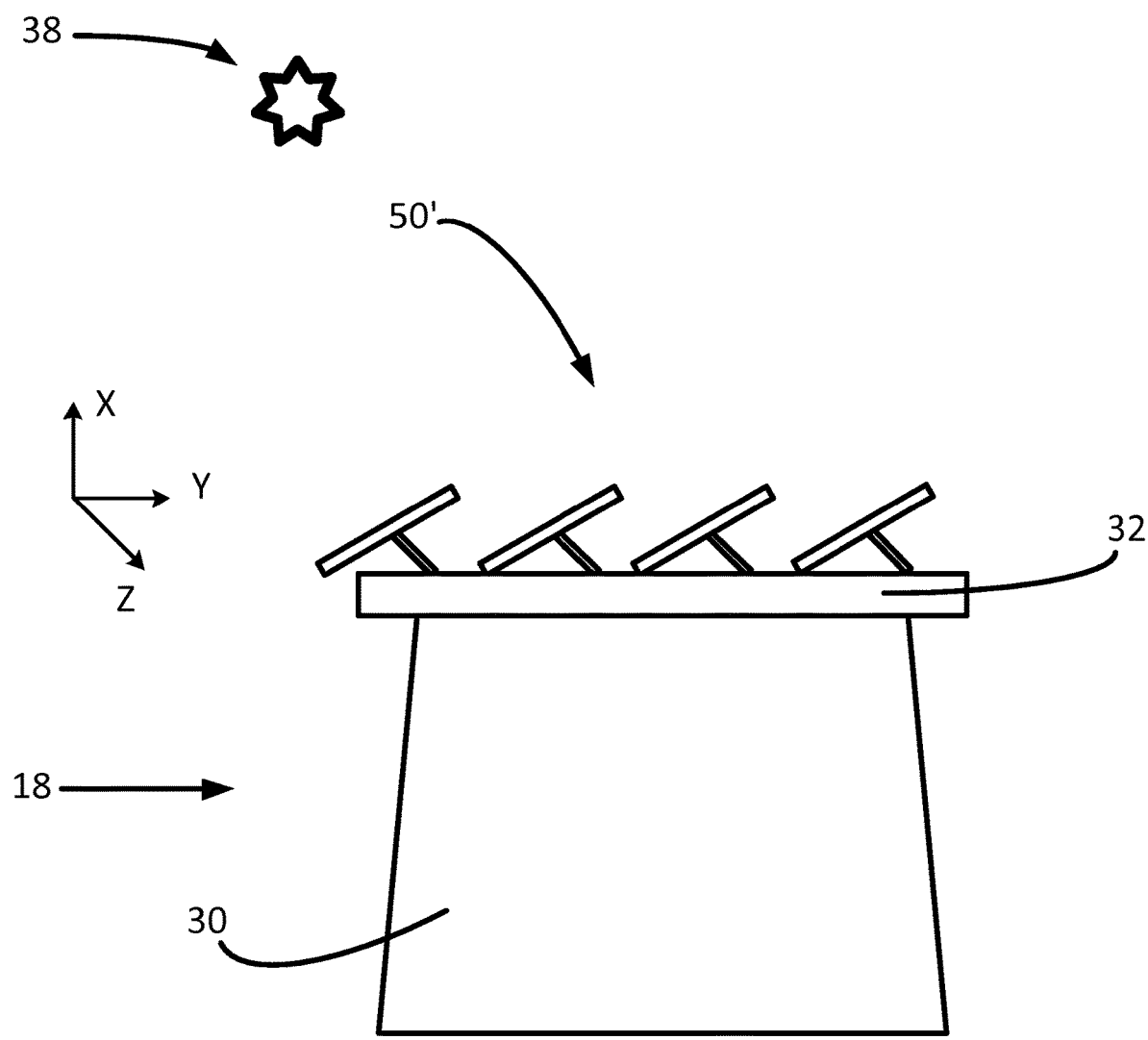
FIG. 6 is an illustration of an additional embodiment of an agricultural vehicle cab according to the invention.

The linkage 52 may comprise any suitable arrangement or configuration of joints or connections to allow for the solar panel 50 to be translationally and rotationally moved. Preferably, the linkage 52 allows for the panel to be rotated about at least one, preferably two, further preferably three axes of rotation, e.g. the X-, Y- and Z-axes indicated as in FIG. 5. It will further be understood that the cab 18 may be provided with a plurality of solar panels 50 on the roof section 32, preferably wherein each solar panel 50 is individually moveable. Such a configuration is illustrated in FIG. 6, wherein reference numerals common to the embodiments are re-used. Here, the single panel 50 of FIG. 5 is replaced with an array of smaller panels indicated generally at 50', which can individually be moveable to provide the best power output based on the current position of the sun 38. The use of a plurality of smaller moveable panels 50' provides the advantages of dynamically adjustable panel direction to maximise solar panel area, without requiring s significant increase in height. It will be understood that for the embodiments of FIGS. 5 and 6, when the panels 50,50' are positioned relatively horizontally to be substantially parallel to the cabin roof, panels 50,50' at the edge of the roof section 32 may be arranged to present a cantilevered shading, projecting beyond the edge of the roof section 32.

Through use of a sun sensor 34 to determine the relative position of the sun 38,38', the roof section 32 can be controlled to automatically move relative to the cab window section 30 to provide an adaptive sun shade for the vehicle cab 18. Accordingly, the interior of the agricultural vehicle cab 18 is prevented from overheating due to solar radiation, and a vehicle operator in the cab 18 is shaded from the blinding effect of direct sunlight, by the automatic movement of the cab roof section 32. Accordingly, the invention provides a agricultural vehicle cab, and an associated agricultural vehicle, having greater flexibility and ease of use.

The invention is not limited to the embodiments described herein, and may be modified or adapted without departing from the scope of the present invention.

The invention claimed is:

1. An agricultural vehicle cab having:
    a cab window section providing a panoramic view from an interior of the cab;
    a single roof section provided on top of the cab; and
    a sun sensor,
    wherein the single roof section is moveable relative to the cab window section to shade the interior of the cab, and wherein the movement of the single roof section is controlled based on the position of the sun determined by the sun sensor, and wherein the agricultural vehicle cab comprises a first actuator to effect longitudinal movement of the single roof section relative to the cab window section, and wherein the agricultural vehicle cab comprises a second actuator to effect lateral movement of the single roof section relative to the cab window section such that the single roof section can be moved in the longitudinal and the lateral directions anywhere between extreme forward and aft longitudinal positions and extreme side-to-side lateral positions above the cab window section.

2. The agricultural vehicle cab of claim 1, wherein the cab comprises a panoramic cab, having a substantially unobstructed cab window section.

3. The agricultural vehicle cab of claim 1, wherein the roof section comprises at least one telescopic element arranged to extend and retract based on the position of the sun measured by the sun sensor.

4. The agricultural vehicle cab of claim 1, wherein the agricultural vehicle cab further comprises a user interface to provide user control of the roof section position.

5. The agricultural vehicle cab of claim 1, wherein a reflective material is provided on at least a portion of the roof section, such that the reflective material acts to reflect solar radiation away from the agricultural vehicle cab.

6. The agricultural vehicle cab of claim 1, wherein the first or second actuators comprise at least one of the following: a rack-and-pinion actuation element, a hydraulic actuator, an electric motor.

7. The agricultural vehicle cab of claim 1, wherein the agricultural vehicle cab further comprises a rain sensor and/or a wind direction sensor, wherein movement of the roof section is controlled at least in part based on the detection of rain by the rain sensor and/or on the wind direction at the agricultural vehicle cab.

8. The agricultural vehicle cab of claim 1, wherein the agricultural vehicle cab further comprises an accelerometer or directional sensor, wherein the movement of the roof section is based at least in part on the direction of movement of the agricultural vehicle cab detected by the accelerometer or directional sensor.

9. The agricultural vehicle cab of claim 1, wherein the agricultural vehicle cab further comprises an inclinometer, wherein the movement of the roof section is based at least in part on the incline or orientation of the agricultural vehicle cab.

10. The agricultural vehicle cab of claim 1, wherein the agricultural vehicle cab further comprises a position sensor, wherein the movement of the roof section is based at least in part on the position of the agricultural vehicle cab.

11. The agricultural vehicle cab of claim 10, wherein the position sensor comprises a GNSS sensor.

12. The agricultural vehicle cab of claim 1, wherein the roof section is provided with at least one photovoltaic element to generate power for supply to a power consumer.

13. An agricultural vehicle having an agricultural vehicle cab as claimed in claim 1.

* * * * *